(12) United States Patent  
Schiller et al.

(10) Patent No.: US 8,946,311 B2  
(45) Date of Patent: Feb. 3, 2015

(54) METHOD FOR PRODUCING POLYURETHANE INSULATING FOAMS

(75) Inventors: Carsten Schiller, Muelheim an der Ruhr (DE); Matthias Naumann, Greensboro, NC (US); Ruediger Landers, Essen (DE); Christian Eilbracht, Herne (DE)

(73) Assignee: Evonik Degussa GmbH, Essen (DE)

( * ) Notice: Subject to any disclaimer, the term of this patent is extended or adjusted under 35 U.S.C. 154(b) by 429 days.

(21) Appl. No.: 12/864,285

(22) PCT Filed: Dec. 22, 2008

(86) PCT No.: PCT/EP2008/068136  
§ 371 (c)(1),  
(2), (4) Date: Jul. 23, 2010

(87) PCT Pub. No.: WO2009/092505  
PCT Pub. Date: Jul. 30, 2009

(65) Prior Publication Data  
US 2010/0294982 A1 Nov. 25, 2010

(30) Foreign Application Priority Data  
Jan. 24, 2008 (DE) .......................... 10 2008 005 946

(51) Int. Cl.  
*C08G 18/08* (2006.01)

(52) U.S. Cl.  
USPC ............ 521/123; 521/100; 521/122; 521/170

(58) Field of Classification Search  
USPC .................................. 521/100, 122, 123, 170  
See application file for complete search history.

(56) References Cited

U.S. PATENT DOCUMENTS

| 5,173,518 | A | * | 12/1992 | Bott et al. | 521/172 |
| 5,254,597 | A | * | 10/1993 | Horn et al. | 521/51 |
| 5,346,928 | A | * | 9/1994 | De Vos et al. | 521/166 |
| 2005/0014854 | A1 | * | 1/2005 | Carcich | 521/50 |
| 2007/0142484 | A1 | * | 6/2007 | Carcich | 521/50 |

FOREIGN PATENT DOCUMENTS

| EP | 0388952 | 9/1990 |
| EP | 0405439 | 1/1991 |
| EP | 0513573 | 11/1992 |
| EP | 0545175 | 6/1993 |
| WO | WO 96/00750 | 1/1996 |

OTHER PUBLICATIONS

Office Action issued in CN Patent Application No. 200880125423.9 mailed Jan. 18, 2013 and English Translation of the Text thereof.

* cited by examiner

*Primary Examiner* — John Cooney  
(74) *Attorney, Agent, or Firm* — Frommer Lawrence & Haug LLP

(57) ABSTRACT

The object of the invention is a method for producing polyurethane and/or polyisocyanurate insulating foam based on foaming reaction mixtures containing polyisocyanates, compounds having reactive hydrogen atoms, propellants, stabilizers, nucleation agents, and optionally further additives, which is characterized in that porous solids, in particular silicates having a zeolite structure, are used as the nucleation agents.

17 Claims, No Drawings

METHOD FOR PRODUCING POLYURETHANE INSULATING FOAMS

The invention relates to a process for producing polyurethane or polyisocyanurate foams having an improved insulating efficiency using porous particles as nucleating agents.

The production of polyurethane or polyisocyanurate foams by foaming foamable reaction mixtures based on polyisocyanates, compounds having reactive hydrogen atoms, blowing agents, stabilizers and, if appropriate, further additives is nowadays carried out on a large industrial scale. For this purpose, all components with the exception of the polyisocyanate are generally preformulated to form a processable mixture (A component) and this is mixed with the polyisocyanate (B component) in a foaming plant. In the initially liquid reaction mixture, foam formation and the polyaddition reaction occur simultaneously until the material has cured after a short time to give a hard, thermoset foam.

Since exclusively thermoset polyurethanes and polyisocyanurates are used for insulation materials, processing by means of extrusion processes as are prior art in the case of thermoplastics is not possible.

The various industrial fields of use have specific and very different and sometimes contradictory requirements in terms of the physical and technical properties of the respective polyurethane or polyisocyanurate foams: rigid foams, flexible foams; low foam density, high foam density; small cells, large cells, etc.

To produce thermoset insulation foams, it is necessary to produce rigid foams having a relatively low foam density of <50 kg/m$^3$ and, as essential criterion, many small closed cells (high cell count). The cells should be distributed essentially uniformly over the entire moulding, i.e. have no gradients.

For a foam to be able to be formed, a blowing gas is required. This can be $CO_2$ which is formed from the reaction of isocyanate with water or is additionally added and/or an added low-boiling organic liquid.

The gas formed has to leave the liquid phase and form bubbles which during the rise phase of the foam grow to form the future foam cells. The formation of the initially microscopically small bubbles in the liquid phase is referred to as nucleation and requires, in a manner analogous to other physicochemical nucleation processes (e.g. precipitation reactions), an activation energy. It is certain that the supersaturation of the liquid reaction mixture with the blowing gas formed/added which can be achieved during the foaming reaction is not sufficient to effect adequate self-nucleation, i.e. the automatic formation of gas bubbles. Rather, the majority of the cells present in the finished foam already have to be present as small (air) gas bubbles in the nucleation phase. During the foaming reaction, the individual gas bubbles dispersed in the reaction mixture then grow by inward diffusion of the blowing gas evolved into these air bubbles which serve as nuclei. It follows that very many nuclei have to be produced in the liquid reaction mixture before commencement of the foam formation phase in order to produce an insulation foam.

This process is the basis of the morphological properties, viz. cell count and cell size distribution, of the foam formed.

Silicone foam stabilizers which are concomitantly used can serve to aid bubble formation during nucleation by reducing the surface tension and thus the energy necessary for formation of the bubble nuclei and also by stabilizing the dispersion of air in the reaction mixture.

Stabilizers for polyurethane foams are predominantly water-soluble polyether siloxanes. These are reaction products of polydimethylsiloxanes with copolymers of ethylene oxide and propylene oxide. They are of considerable importance for the production of polyurethane foams. Phenomenologically, the task of the foam stabilizer is, according to present-day understanding, not only to aid bubble formation during nucleation but also to emulsify the foam raw materials and to stabilize the expanding foam by, inter alia, ensuring surface elasticity in the expanding membranes of the foam by means of the Gibbs-Marangoni effect: in brief, to maintain the thermodynamically unstable state of a foam during the rise process until it has cured by means of surface forces. Despite numerous studies, their mode of action in foam formation has not yet been conclusively elucidated.

Although these compounds influence the fineness and regularity of the cell structure to a certain extent, the amount which can be used cannot be chosen freely because of the abovementioned manifold interactions, in particular because of the negative accompanying phenomena, e.g. overstabilization, which then occur and can in extreme cases even lead to crack formation and to shrinkage, i.e. make the foam completely unusable. In addition, the positive influence of cell stabilizers on nucleation and thus on the fineness of the cells of the foam is subject to saturation behaviour in respect of the use concentration of the stabilizer, i.e. there is a limit to the cell fineness beyond which the cells cannot be made smaller by further increasing the stabilizer concentration.

However, depending on the production process and depending on the further raw materials used, an only unsatisfactory cell fineness is obtained in some cases.

As a further technical solution, heterogeneous nucleation on solids, in particular the use of nanoparticles or nanostructured particles, has been proposed (EP 1 683 831, EP 1 209 189, WO 2005/019328). These are generally premixed into the polyol components. The average primary particle diameter of these powders is preferably in the range from 1 to 200 nm, preferably in the range from 10 to 50 nm, in at least one dimension.

Such particles can preferably be, in at least one dimension, nanosize particles or nanostructured particles which are particularly preferably selected from the group consisting of metals, metal oxides, mixed oxides, nitrides, hydroxides, carbonates, metal salts, other inorganic or organic salts, silicates, silicone resins, silicones, carbon (e.g. activated carbon) and/or organic polymers. Preferred examples are silicon dioxide, zinc oxide, aluminium oxide, zirconium dioxide, titanium dioxide, silicates and boron nitrides and also other inorganic salts.

It has been established that the cell structure becomes finer when the nanosize particles are used (EP 1 683 831, EP 1 209 189, WO 2005/019328). In practice, however, very different response behaviour is observed for different polyurethane or polyisocyanurate rigid foam formulations: while in some formulations containing suitable nanoparticles, significant cell refinement is found, the desired effect is absent in the case of other formulations.

For the sake of completeness, it may be mentioned that foam formation can occur not only during the polymerization reaction as described here for polyurethane formation but also in extrusion processes. However, these extrusion processes are different in principle from the polyurethane formation reactions with thermoset foam formation described here. Thus, for example, WO 2002/034823 describes an extrusion process for thermoplastics which leads to formation of multimodal thermoplastic polymer foams.

The systems of nonthermoplastic but thermoset polyurethane or polyisocyanurate foams with which the invention is concerned, on the other hand, display a generally preferred uniform, monomodal cell size distribution.

The thermoset systems with which the present application is concerned are therefore not obtainable by extrusion processes.

A further disadvantage observed in the case of many (nano)-particles is that the (polyol) mixtures in which these particles are present have to be processed further immediately or at least within a very short period of time. However, after the storage times which are generally required for operational reasons in industrial processes, the initially observed effect is minimized or often no longer present. The use of nanoparticles as nucleating agents in polyurethane foams (PU foams) for producing insulation materials has therefore not been able to become established in industry.

There is therefore a continuing need for effective nucleating agents which even in small amounts bring about an increase in the cell count, i.e. a shift in the cell size distribution in the direction of smaller cell diameters, which is equivalent to an improvement in the insulating efficiency, in customary industrial formulations for PU insulation foams.

It was an object of the invention to provide a novel process for producing rigid polyurethane foam mouldings having improved insulating action.

It has now surprisingly been found that the use of porous solids, in particular silicates having a zeolite structure, as nucleating agents enables an increase in the cell count and thus an improvement in the insulating action to be achieved. This effect of particles according to the invention is retained even when industrially customary storage times occur between dispersion of the particles in the PU foam raw materials or systems and their processing to produce the insulating foam.

The use of zeolites in PU foams is already known.

The production of rigid polyurethane foam mouldings is described, for example, in DE-1 694 138. The shaped bodies have a dense outer skin and a density distribution which varies over the cross section of the moulding. Such foams are generally referred to as "integral foams". The use of low-boiling solvents as blowing agents is essential for producing this "integral structure"; the chlorofluorocarbons (CFCs) R 11 and R 113 are very particularly suitable for this purpose.

The production of polyurethane foams having a compact surface and a cellular core ("integral structure") using alkali metal aluminium silicates having a zeolite structure is also known from DE-1 804 362. However, the foams disclosed in this prior publication are foams having a foam density in the range from about 60 to 120 kg/m$^3$, with the main concern of the authors being to produce foams which do not shrink despite the concomitant use of fluorochlorocarbons.

EP 0 319 866 describes a process for producing polyurethane mouldings ("integral structure") having a foam density of at least 300 kg/m$^3$, in which zeolitic adsorbents are used together with water and/or carbon dioxide.

EP 1 544 229 describes a process for producing integral polyurethane foams, which is characterized in that
(A) a polyol formulation comprising at least one polyol component is reacted with
(B) an isocyanate component comprising organic and/or modified organic polyisocyanates and inorganic zeolites.

U.S. Pat. No. 4,518,718 describes a process for producing hybrid polyurethane-polyimide foams, in which molecular sieves of the zeolite type are used for removing water/gases from the reaction mixture.

Many literature references describe further applications such as the removal of volatile constituents (US 2007/78193); reduction of the amount of blowing agents containing halogenated hydrocarbons (U.S. Pat. No. 5,137,929); as support material for catalysts (EP 0 396 092) or blowing agents (JP 57-051728); the adsorption of carbon dioxide from the foam (EP 0 723 988, WO 90/11320, JP 01-102288, JP 01-121675, JP 02-206625, JP 03-292113, JP 03-137138, JP 08-073775, JP 08-198996, JP 56-041233, JP 57-049628, JP 64-067585, JP 64-079571).

However, these literature references cannot render the process of the invention obvious since the object of the invention (use of microporous and/or mesoporous solids as nucleating agents) is neither disclosed nor rendered obvious in the prior publications. None of the references describes the use of zeolites or other microporous and/or mesoporous particles as nucleating agents for making the cells of polyurethane or polyisocyanurate insulation foams finer, but instead the focus is on the adsorption properties of the particles. These adsorption properties are utilized, for example, to dry the foam raw materials, to adsorb constituents of the cell gas (in particular carbon dioxide) or to reduce the liberation of volatile organic constituents (VOCs) from the foam. To ensure a satisfactory adsorption capacity, large amounts of sometimes over 50 parts by weight per 100 parts by weight of polyol are used. These amounts used are far above the optimum for effecting the cell refinement by nucleation which is now claimed. When large amounts are used, adverse effects on cell fineness and content of closed cells, which are usually observed in the case of high use concentrations of solid fillers in insulation foam systems, predominate. When zeolites are used in polyurethane foams according to the prior art, a cell refining effect accordingly does not occur.

The present invention accordingly provides a process for producing polyurethane or polyisocyanurate insulation foams based on foamable reaction mixtures containing polyisocyanates, compounds having reactive hydrogen atoms, blowing agents, stabilizers, nucleating agents and, if appropriate, further additives, which is characterized in that porous solids, in particular silicates having a zeolite structure, are used as nucleating agents.

The invention further provides polyurethane and polyisocyanurate insulation foams produced by this process.

Further subjects of the invention are characterized by the contents of the dependent claims.

The PU insulation foams produced by the process of the invention have a density of <50 kg/m$^3$, typically from 25 to kg/m$^3$, and compared to conventional insulation foams display an increase in the cell count, i.e. a shift in the cell size distribution in the direction of smaller cell diameters, and thus an improved insulating efficiency.

It has in this way surprisingly been possible to achieve a significantly increased number of cells per centimeter together with a desirably decreased thermal conductivity both in the initial state and also in the aged state of the foams by mixing in the porous particles used according to the invention. It is particularly surprising and remarkable that the addition of the porous particles according to the invention is more effective than the addition of nanoparticles, i.e. the cell-refining action and the associated decrease in the thermal conductivity is more pronounced when porous particles are added than when the same amount of nanoparticles is added.

The effectiveness of the porous particles used according to the invention displays little dependence on the polyurethane or polyisocyanurate base formulation, i.e. the porous particles can be used for improving the insulation properties in a wide variety of polyurethane or polyisocyanurate formulations. A reduction in the thermal conductivity as a result of mixing in the porous particles can be observed both in the case of formulations which have already been optimized by exploiting the methods known to those skilled in the art in respect of cell fineness and low thermal conductivity, i.e. those which correspond to the prior art for use as insulation foam, and also formulations which have been optimized in respect of other foam properties and do not yet display the best cell fineness and thermal conductivity which can be achieved according to the prior art.

The unoptimized foams defined according to the invention under laboratory conditions and using a demonstration composition to emphasise the inventive effect have a thermal conductivity of less than or equal to 22.4 mW/m*K which can be reduced significantly further by addition of further auxiliaries and additives known to those skilled in the art. Particular preference is given to a thermal conductivity of less than 20 mW/m*K.

The number of cells per centimeter, too, is in the range of >40 cells/cm and thus in the range relevant to use, but can likewise be optimized further by addition of further known auxiliaries and additives. Particular preference is given to a cell count of at least 50 cells per centimeter.

The porous solids used for the purposes of the present invention are microporous to mesoporous particles. Microporous means, according to the IUPAC definition, that the average diameter of the pores is <2 nm. Mesoporous means, according to the IUPAC definition, that the average diameter is from 2 to 50 nm.

The particle size of the porous solids used according to the invention is relatively noncritical and can be from the nanometer range to the micron range. The typical average particle size is less than 100 μm, preferably <50 μm.

According to the invention, it is possible to use all microporous and mesoporous organic and/or inorganic solids which are insoluble in the reaction mixture, for example porous silica, microporous and/or mesoporous silica gels, microporous and/or mesoporous silicates or aluminosilicates ("MCM 41" as example of a mesoporous silicate) and also microporous and/or mesoporous carbon.

Preference is given, according to the invention, to solids having a zeolite structure, e.g. aluminosilicates of the general formula

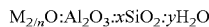

$$M_{2/n}O:Al_2O_3:xSiO_2:yH_2O$$

where
M is at least one metal having a valency of n and
x and y can have any values which are usual for zeolites.

Here, the term "zeolite" is to be understood according to the definition of the IMA (International Mineralogical Association) of 1998: "a zeolite is a crystalline substance with a structure characterized by a framework of linked tetrahedra, each consisting of four oxygen atoms surrounding a cation. This framework contains open cavities in the form of channels and cages. These are usually occupied by water molecules and extra-framework cations that are commonly exchangeable. The channels are large enough to allow the passage of guest species. In the hydrated phases, dehydration occurs at temperatures mostly below about 400° C. and is largely reversible. The framework may be interrupted by (OH, F) groups; these occupy a tetrahedron apex that is not shared with adjacent tetrahedra." (Coombs, D. S., Alberti, A., Armbruster, Th., Artioli, G., Colella, C., Galli, E., Grice, J. D., Liebau, F., Mandarino, J. A., Minato, H., Nickel, E. H., Passaglia, E., Peacor, D. R., Quartieri, S., Rinaldi, R., Ross, M., Sheppard, R. A., Tillmanns, E., Vezzalini, G.; *Eur. J. Mineral.*, 10 (1998) 1037).

Particular preference is given to zeolites of the faujasite type FAU (zeolite X and zeolite Y), of the structure type LTA (zeolite A), of the structure type MFI (ZSM-5), of the mordenite type MOR and of the gismondine type GIS (zeolite P and zeolite B).

Microporous and mesoporous solids have a very large (internal) surface area and are naturally good adsorbents, i.e. the pores can be filled with various substances.

Pretreatment of the porous particles by targeted loading of the pores has effects on the cell-refining action of the particles when used for producing insulation foams. For example, the cell-refining action can be increased further compared to untreated porous particles when the pores are loaded with volatile fluorinated hydrocarbons, preferably HFC 245fa, HFC 134a, HFC 365 mfc and HCFC 141b, particularly preferably perfluorinated compounds such as perfluoropentane and perfluorohexane. The invention therefore also provides for the use of correspondingly pretreated microporous and mesoporous particles for producing insulation foams and also the insulation foams produced in this way. The porous solids can be added directly to the reactive mixture or be premixed with one of the components, preferably the polyol component, if appropriate together with further auxiliaries and additives.

They are used in amounts of from 0.1 to <5 parts by weight, preferably from 0.2 to 3 parts by weight, in particular from 0.5 to 1.5 parts by weight, per 100 parts by weight of the polyol component.

The nucleating agents used according to the invention can in principle be used in the customary foamable formulations for insulation foams comprising compounds having reactive hydrogen atoms (A), the polyisocyanate component (B) and customary auxiliaries and additives (C).

As polyol components (A), it is possible to use the compounds customary for the formulation of insulation foams, for example polyether polyols and polyester polyols. Polyether polyols are obtained by reaction of polyhydric alcohols or amines with alkylene oxides. Polyester polyols are based on esters of polybasic carboxylic acids (usually phthalic acid or terephthalic acid) with polyhydric alcohols (usually glycols).

As polyisocyanate components (B), it is possible to use the compounds customary for the formulation of insulation foams, for example diphenylmethane 4,4'-diisocyanate (MDI), tolylene diisocyanate (TDI), hexamethylene diisocyanate (HMDI) and isophorone diisocyanate (IPDI). The mixture of MDI and further condensed analogues having an average functionality of from 2 to 4, which is known as "polymeric MDI" ("crude MDI"), is particularly useful.

A suitable ratio of isocyanate to polyol, expressed as the index of the formulation, is in the range from 80 to 500, preferably from 100 to 350.

As auxiliaries and additives (C), it is possible to use the compounds customary for the formulation of insulation foams, including catalysts, cell stabilizers, blowing agents, flame retardants, fillers, dyes and light stabilizers.

Suitable catalysts for the purposes of the present invention are substances which catalyse the gelling reaction (isocyanate-polyol), the blowing reaction (isocyanate-water) or the dimerization or trimerization of the isocyanate.

Typical examples are the amines triethylamine, dimethylcyclohexylamine, tetramethylethylenediamine, tetramethylhexanediamine, pentamethyldiethylenetriamine, pentamethyldipropylenetriamine, triethylenediamine, dimethylpiperazine, 1,2-dimethylimidazole, N-ethylmorpholine, tris(dimethylaminopropyl)hexahydro-1,3,5-triazine, dimethylaminoethanol, dimethylaminoethoxyethanol and bis(dimethylaminoethyl)ether, tin compounds such as dibutyltin dilaurate and potassium salts such as potassium acetate and potassium 2-ethylhexanoate. Suitable amounts depend on the type of catalyst and are usually in the range from 0.05 to 5 parts by weight or from 0.1 to 10 parts by weight in the case of potassium salts, based on 100 parts by weight of polyol.

Suitable cell stabilizers are surface-active substances such as organic surfactants or preferably silicone surfactants (polyether-polydimethylsiloxane copolymers). Typical amounts of polyether siloxane cell stabilizers used are from 0.5 to parts by weight per 100 parts by weight of polyol, preferably from 1 to 3 parts by weight per 100 parts by weight of polyol.

Water is usually added as chemical blowing agent to the foamable formulation since it reacts with isocyanates with evolution of carbon dioxide gas. Suitable water contents for the purposes of the present invention depend on whether physical blowing agents are used in addition to water. In the case of purely water-blown foams, the values are typically from 1 to 20 parts by weight per 100 parts by weight of polyol, while if other blowing agents are additionally used, the amount used is reduced to usually from 0.1 to 5 parts by weight per 100 parts by weight of polyol.

Suitable physical blowing agents for the purposes of the present invention are gases, for example liquefied $CO_2$, and volatile liquids, for example hydrocarbons having from 4 to 5 carbon atoms, preferably cyclopentane, isopentane and n-pentane, fluorinated hydrocarbons, preferably HFC 245fa, HFC 134a and HFC 365mfc, chlorofluorocarbons, preferably HCFC 141b, oxygen-containing compounds such as methyl formate and dimethoxymethane or chlorinated hydrocarbons, preferably 1,2-dichloroethane. Apart from water and, if appropriate, physical blowing agents, it is also possible to use other chemical blowing agents which react with isocyanates with evolution of gas, for example formic acid.

Insulation foams for the thermal insulation of buildings are subjected to fire protection requirements and have to be provided with flame retardants. Suitable flame retardants for this purpose are preferably liquid organic phosphorus compounds such as halogen-free organic phosphates, e.g. triethyl phosphate (TEP), halogenated phosphates, e.g. tris(1-chloro-2-propyl)phosphate (TCPP) and tris(2-chloroethyl)phosphate (TCEP), and organic phosphonates, e.g. dimethyl methanephosphonate (DMMP), dimethyl propanephosphonate (DMPP), or solids such as ammonium polyphosphate (APP) and red phosphorus. Further suitable flame retardants are halogenated compounds, for example halogenated polyols, and also solids such as expandable graphite and melamine.

Further subjects of the invention may be derived from the claims whose disclosure content is hereby fully incorporated by reference into the present description.

The following examples illustrate the invention but do not restrict its scope in any way.

The processes of the invention for producing polyurethane and polyisocyanurate insulation foams and the use of porous solids in these processes are described below by way of example without the invention being restricted to these illustrative embodiments. Where ranges, general formulae or classes of compounds are indicated below, these do not encompass only the respective ranges or groups of compounds which are explicitly mentioned but also all subranges and subgroups of compounds which can be obtained by leaving out individual values (ranges) or compounds. Where documents are cited in the present description, their contents are fully incorporated by reference into the disclosure of the present invention.

EXAMPLES

A typical polyurethane or polyisocyanurate insulation foam formulation for the purposes of the present invention gives a foam density of from 25 to 45 kg/m³ and has the following composition:

TABLE 1

| Component | Proportion by weight |
| --- | --- |
| Polyol | 100 |
| Amine catalyst | 0.05-5 |
| Potassium trimerization catalyst | 0-10 |
| Polyether siloxane | 0.5-5 |
| Water | 0.1-20 |
| Blowing agent | 0-40 |
| Flame retardant | 0-50 |
| Isocyanate index: | 80-500 |

The processing of the formulations according to the invention to give rigid foams can be carried out by all methods familiar to those skilled in the art, for example in manual mixing processes or preferably with the aid of high-pressure foaming machines.

The invention is illustrated further by the following examples.

It may be pointed out the experimental data are based on laboratory polyurethane systems which have not been optimized in terms of their use properties so as to be able to rule out secondary influences caused by the addition of further additives and aggregates.

For the use comparison, the following foam formulation was used (Table 2):

| Component | Amount used |
| --- | --- |
| Polyether polyol* | 95 g (100 parts) |
| DMCHA** | 1.4 g (1.5 parts) |
| Water | 2.5 g (2.6 parts) |
| Cyclopentane | 12.4 g (13.1 parts) |
| Stabilizer*** | 1.4 g (1.5 parts) |
| Nucleating agent | 0.95 g (1.0 part) |
| MDI**** | 188.6 g (198.5 parts |

*Daltolac R 471 from Huntsman, OH number: 470 mg KOH/g, functionality: 4.1
**DMCHA: Dimethylcyclohexylamine serves as amine catalyst
***TEGOSTAB B 8462 from Evonik Goldschmidt, a polyether siloxane
****polymeric MDI, 200 mPa*s, 31.5% of NCO, functionality: 2.7

Nucleating agents used were (Table 3):

| Substance | Supplier/Comment |
| --- | --- |
| according to the invention | |
| Molecular sieve 4A | Fluka, zeolite A, microporous, $Na_{12}[(AlO_2)_{12}(SiO_2)_{12}] \cdot x\ H_2O$ |
| Molecular sieve 5A | Fluka, zeolite A, microporous, $Ca_nNa_{12-2n}[(AlO_2)_{12}(SiO_2)_{12}] \cdot x\ H_2O$ |
| Molecular sieve 13X | Fluka, zeolite X, microporous, $Na_{86}[(AlO_2)_{86}(SiO_2)_{106}] \cdot x\ H_2O$ |
| Molecular sieve 13X + PFA | zeolite X as before but pretreated by dispersion in perfluoropentane and subsequent drying in air |
| Zeoflair 100 | Zeochem, zeolite ZSM-5, microporous |
| Silica Gel Grade 62 | Sigma-Aldrich, silica gel for chromatography, mesoporous |
| comparative example not according to the invention | |
| silica sand powder | Particle size <50 μm, nonporous |
| $SiO_2$ nanoparticles: Aerosil ® R 8200 | Evonik Industries, pyrogenic silica, |

-continued

| Substance | Supplier/Comment |
|---|---|
| | surface-modified, nonporous |

The comparative foaming tests were carried out by a manual mixing process. For this purpose, polyol, catalysts, water, foam stabilizer, nucleating agent and blowing agent were weighed into a beaker and mixed by means of a disc stirrer (6 cm diameter) at 1,000 rpm for 30 s. The amount of blowing agent which had evaporated during mixing was determined by weighing again and was replaced. The MDI was now added, the reaction mixture was stirred by means of the stirrer described at 2,500 rpm for 7 s and immediately transferred to an aluminium mould which had dimensions of 145 cm×14 cm×3.5 cm, was inclined at an angle of 10° (along the 145 cm side) and was lined with polyethylene film and was thermostatted at 45° C. The foam formulation was introduced at the end located at a lower level so that the expanding foam fills the mould in the region of introduction and rises in the direction of the end located at a higher level. The amount of foam formulation used was calculated so that it was 10% above the amount necessary for just filling the mould.

After 10 minutes, the foams were removed from the mould. One day after foaming, the foams were analysed. Surface and internal defects were assessed subjectively on a scale from 1 to 10, with 10 representing an (idealized) undisrupted foam and 1 representing an extremely strongly disrupted foam. The pore structure (average number of cells per 1 cm) was assessed visually on a cut surface by comparison with comparative foams. The thermal conductivity was measured on 2.5 cm thick discs using a Hesto λ Control instrument at temperatures at the underside and upper side of the specimen of 10° C. and 36° C. To determine a value for the thermal conductivity after ageing, the test specimens were stored at 70° C. for 7 days and then measured again.

The results are shown in Table 4 below:

| Nucleating agent | Thermal conductivity mW/m*K | | Cells/cm | Defects (top/ bottom/interior) |
|---|---|---|---|---|
| | initial | aged | | |
| according to the invention | | | | |
| Zeolite 4A | 22.4 | 24.2 | 40-44 | 4/5/8 |
| Zeolite 5A | 22.2 | 23.9 | 40-44 | 4/5/8 |
| Zeolite 13X | 22.2 | 24.2 | 40-44 | 4/4/8 |
| 13X + PFA | 21.9 | 23.9 | 40-44 | 4/5/8 |
| Zeoflair 100 | 22.1 | 24.1 | 40-44 | 4/4/8 |
| Silica gel 62 | 22.4 | 24.3 | 40-44 | 4/4/7 |
| comparative examples not according to the invention | | | | |
| none | 22.7 | 24.6 | 35-39 | 4/5/8 |
| silica powder | 22.8 | 24.9 | 35-39 | 4/4/7 |
| Aerosil R8200 | 22.5 | 24.5 | 35-39 | 4/4/8 |

The results show that a significant improvement in the thermal conductivity can be achieved using the porous particles according to the invention—the values both in the fresh state and in the aged state are from 0.3 to 0.7 mW/m*K below the reference value for the foam without addition of nucleating agents.

When the cell fineness of the foams is compared, a larger number of cells per centimeter, i.e. a finer cell structure, is found in the case of the foams with addition of the particles according to the invention than for the comparative foam without nucleating agent. The finer cell structure shows that the porous particles promote nucleation of the foam cells and can be regarded as the reason for the reduction in the thermal conductivity.

All other foam properties relevant to use are not influenced or influenced only insignificantly by the particles according to the invention. Even in the case of the quite sensitive surface quality of the foam test specimens, no deterioration or only a marginal deterioration was found.

The silica sand powder which was likewise examined as comparative example not according to the invention does not display the positive effect of the particles according to the invention, i.e. the cell structure is not made finer and the thermal conductivity is not decreased by silica sand powder.

Even when nanoparticles in the form of pyrogenic silica are used, only a minimal reduction in the thermal conductivity (0.1 to 0.2 mW/m*K) is observed, which is a significantly smaller effect than in the case of the porous particles according to the invention.

In chemical terms, both silica sand and pyrogenic silica are silicon dioxide and thus have a chemical relationship with the abovementioned porous particles which belong to the family of silicates. However, a significant difference is that the silica powder and pyrogenic silica are neither microporous nor mesoporous, in contrast to the particles according to the invention. This suggests that the positive effect of the particles according to the invention is due to their microporous or mesoporous structure.

The invention claimed is:

1. A process for producing polyurethane and polyisocyanurate insulation foams based on foamable reaction mixtures containing polyisocyanates, compounds having reactive hydrogen atoms, blowing agents, stabilizers, nucleating agents and, if appropriate, further additives, the process comprising:
    utilizing porous solids having a zeolite structure as nucleating agents in an amount of 0.2 to 1.5 parts by weight zeolite per 100 parts by weight polyol;
    wherein the insulation foams produced have a density of from 25 kg/m$^3$ to 45 kg/m$^3$; and
    wherein the insulation foams produced have a number of cells per centimetre is in the range of greater than 40 cells/cm.

2. The process for producing polyurethane and polyisocyanurate insulation foams according to claim 1;
    wherein porous silica, microporous and/or mesoporous silica gels, microporous and/or mesoporous silicates or aluminosilicates are used as nucleating agents having a zeolite structure.

3. The process for producing polyurethane and polyisocyanurate insulation foams according to claim 2;
    wherein FAU zeolites are used as nucleating agents.

4. The process for producing polyurethane and polyisocyanurate insulation foams according to claim 2;
    wherein LTA zeolites are used as nucleating agents.

5. The process for producing polyurethane and polyisocyanurate insulation foams according to claim 2;
    wherein MFI zeolites are used as nucleating agents.

6. The process for producing polyurethane and polyisocyanurate insulation foams according to claim 2;
    wherein MOR zeolites are used as nucleating agents.

7. The process for producing polyurethane and polyisocyanurate insulation foams according to claim 2;
    wherein GIS zeolites are used as nucleating agents.

8. The process for producing polyurethane or polyisocyanurate insulation foams according to claim 2;

wherein the porous solids, before being utilized as nucleating agents, are pretreated by filling the pores in a targeted manner.

9. The process for producing polyurethane and polyisocyanurate insulation foams according to claim 8;
wherein, in the pretreatment, the pores of the porous solids are filled with fluorine-containing organic compounds.

10. The process for producing polyurethane and polyisocyanurate insulation foams according to claim 9;
wherein, in the pretreatment, the pores of the porous solids are filled with fluorinated hydrocarbons and/or perfluoroalkanes.

11. A polyurethane or polyisocyanurate insulation foam produced according to claim 1.

12. The polyurethane or polyisocyanurate insulation foam according to claim 11;
wherein the polyurethane and polyisocyanurate insulation foams have a thermal conductivity of less than or equal to 22.4 mW/m*K.

13. The process for producing polyurethane and polyisocyanurate insulation foams according to claim 1;
wherein methylendiphenyl diisocyanate MDI is used as isocyanate component.

14. The process for producing polyurethane and polyisocyanurate insulation foams according to claim 10;
wherein methylendiphenyl diisocyanate MDI is used as isocyanate component.

15. The process for producing polyurethane and polyiscyanurate insulation foams according to claim 1;
wherein the insulation foams produced have a thermal conductivity of no more than 22.4 mW/m*K.

16. A polyurethane or polyisocyanurate insulation foam produced according to claim 9.

17. The process for producing polyurethane and polyisocyanurate insulation foams according to claim 9;
wherein the porous solids pretreated and utilized as nucleating agents are zeolite X.

* * * * *